(No Model.)
G. W. SLEEPER.
APPARATUS FOR MANUFACTURING INSOLES FOR SHOES.
No. 563,082.  Patented June 30, 1896.
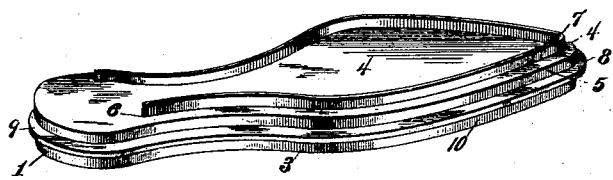
Fig. I.
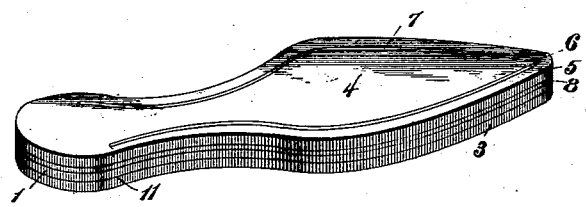
Fig. II.
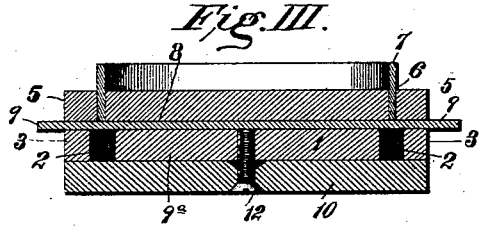
Fig. III.
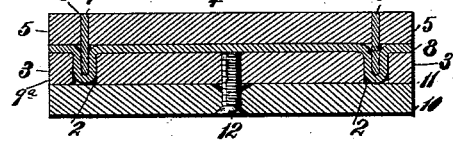
Fig. IV.
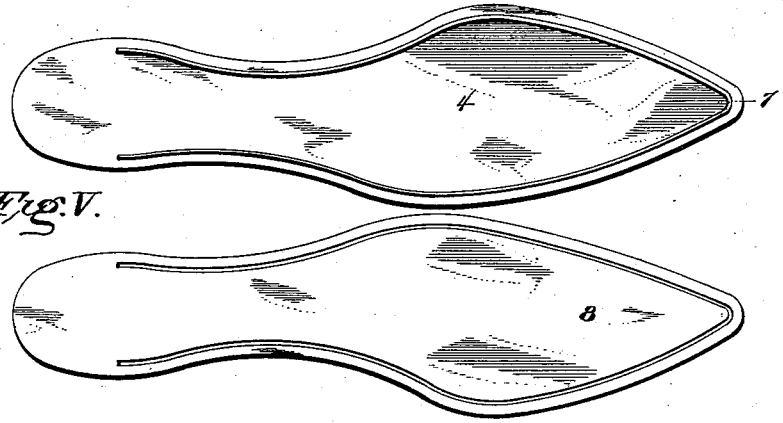
Fig. V.
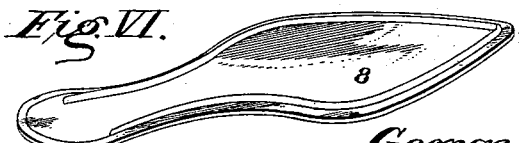
Fig. VI.
WITNESSES
INVENTOR
George W. Sleeper.
By Jasper L. Atkins
Atty.

UNITED STATES PATENT OFFICE.

GEORGE W. SLEEPER, OF DETROIT, MICHIGAN, ASSIGNOR OF TWO-THIRDS TO HENRY S. ROBINSON AND ANDREW W. COMSTOCK, OF SAME PLACE.

APPARATUS FOR MANUFACTURING INSOLES FOR SHOES.

SPECIFICATION forming part of Letters Patent No. 563,082, dated June 30, 1896.

Application filed August 17, 1895. Serial No. 559,690. (No model.)

*To all whom it may concern:*

Be it known that I, GEORGE W. SLEEPER, of Detroit, county of Wayne, State of Michigan, have invented certain new and useful Apparatus for Manufacturing Insoles for Shoes, of which the following is a specification, reference being had to the accompanying drawings.

The object of my invention is to provide means for producing an insole, such as is described in my application filed of even date herewith, that embodies a rib formed in proximity to its outer edge on one side thereof and by a molded groove or channel on the other side thereof.

In the accompanying drawings, Figure I is a perspective view of my apparatus complete, showing the relation of the parts and of the material thereto before the molding and trimming operations. Fig. II is a similar view after the completion of the molding and trimming operations. Fig. III is a transverse section of the subject-matter of Fig. I. Fig. IV is a similar section of the subject-matter of Fig. II. Fig. V is a plan view of both parts of the mold in juxtaposition, with the molded insole in place in the female mold. Fig. VI is a view of the insole detached.

Referring to the figures on the drawings, 1 indicates the female member of my mold. It may be made of wood, metal, or any material of sufficient strength to endure the strain that is put upon it. It is of a thickness to accommodate the channel 2, the depth of the channel being determinable by the depth of the rib which it is desired to form in the insole, the elevation of the rib formed by the channel in the insole being variable in different classes of shoes. The channel 2 may extend entirely around the mold 1 in proximity to its edge, or it may extend only partially around the same, the main portion being left flat and smooth.

The exterior contour 3 of the mold member 1 is made to conform accurately to the size of the foot which the insole to be made upon the mold is intended to fit, and, in practice, molds of graduated sizes are employed.

4 indicates the male member of my apparatus, its exterior contour 5 being made to correspond exactly with the contour 3 of the member 1, so that when both parts are united the contour edges 5 and 3 lie flush with each other throughout their entire extents.

The member 4 is provided with a thin ribbon-like aperture or kerf 6, of an extent corresponding with the extent of groove 2 in the member 1. The kerf 6 is also located directly in alinement with the medial line of the channel 2 and the member 1 when both members are united.

Within the kerf 6 is located a die 7. It is preferably made of thin plate or sheet metal, and, being of a width greater than the thickness of the member 4, is movable transversely through its kerf 6 by pressure applied to its projecting side.

8 indicates the insole.

In practice, the material—for example, leather, canvas, or other fabric from which the insole is to be made—having been selected of a size approximating the size of the insole to be made, but a little larger than the insole, is placed between the members 1 and 4 of my apparatus. When so placed it may be drawn perfectly taut and smooth throughout its entire extent. Afterward the two members 1 and 4 are firmly united, as by clamps or other suitable means, so that the material between them is held smoothly and firmly, but not entirely unyieldingly, between the opposing flat surfaces of the mold members. Next, by pressure applied, as through any ordinary press or by blows from a mallet, the die 7 is forced against the surface of the material between the mold members until a portion of the mold is forced into the channel 2 of a depth to correspond to the relative depth of the channel 2 and the degree of insertion therein of the die 7. When the die 7 has been driven the required depth, the mold members, being still in close contact with the opposite sides of the material, the projecting edge 9 of the material is trimmed away close to the contour edges 3 and 5 of the mold members. In this manner, the contour edges of the mold members being shaped to the required sizes, when the members are separated the insole is completely formed as to its outline and is provided with the rib adjacent to its edge and with a perfectly smooth surface throughout the remainder of its extent.

As above stated, the channel 2 may be made of different depths, but I prefer to construct the member 1 of two plates 9ª and 10, the plane of division being indicated at 11 in the drawings, and to unite them, as by screws 12 or other suitable means, whereby they may be readily detached when required. In such construction the channel 2 extends entirely through one of the plates 9ª. By reversing the position of the plates 9ª and 10 one set of molds will answer for making both insoles of a pair of shoes, the die 7 of the member 4 being adapted to be operated from either side.

What I claim is—

1. In an apparatus for forming an insole, the combination with a pair of mold members having their exterior edges correspondingly shaped with the shape of the insole to be manufactured, of a channel in one member extending substantially in the direction of the outer contour of the mold, a kerf in the second mold member and extending in the direction of the channel, and a die within the kerf in the second member movable transversely through the kerf into the channel of the other member, whereby the mold serves the double purpose of a mold and pattern, substantially as specified.

2. In an apparatus for forming an insole, the combination with a pair of mold members having their exterior edges correspondingly shaped with the shape of the insole to be manufactured, of a channel in one member extending in the direction of the outer contour of the mold and substantially equidistant therefrom throughout its length, a kerf in the second mold member of smaller diameter than the channel and correlative with the same, and a die extending continuously from one end of the kerf to the other and movable transversely through the kerf in one member into the channel of the other member whereby the mold serves the double purpose of a mold and pattern, substantially as specified.

3. In insole-forming apparatus, the combination with one mold member and a transversely-movable die therein, of a second mold member composed of two plates one of the plates being provided with a transverse channel adapted to receive the die, and mechanism for detachably uniting the two plates of the second member whereby their positions may be reversed to produce both right and left soles in the same mold, substantially as specified.

In testimony of all which I have hereunto subscribed my name.

GEORGE W. SLEEPER.

Witnesses:
CHAS. F. PELTIER,
H. J. ROBINSON.